(12) United States Patent
Clochard et al.

(10) Patent No.: US 10,094,687 B2
(45) Date of Patent: Oct. 9, 2018

(54) DISPLAY DEVICE FOR A MOTOR VEHICLE

(71) Applicants: CONTINENTAL AUTOMOTIVE FRANCE, Toulouse (FR); CONTINENTAL AUTOMOTIVE GMBH, Hannover (DE)

(72) Inventors: Pascal Clochard, Chevreuse (FR); Arnaud De Guibert, Montrouge (FR); Jean-Philippe Bekaert, Montigny le Bretonneux (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 22 days.

(21) Appl. No.: 15/117,955

(22) PCT Filed: Feb. 5, 2015

(86) PCT No.: PCT/EP2015/000230
§ 371 (c)(1),
(2) Date: Aug. 10, 2016

(87) PCT Pub. No.: WO2015/120966
PCT Pub. Date: Aug. 20, 2015

(65) Prior Publication Data
US 2016/0347242 A1    Dec. 1, 2016

(30) Foreign Application Priority Data

Feb. 12, 2014 (FR) ...................................... 14 51089

(51) Int. Cl.
*F21V 9/00*    (2018.01)
*G01D 13/20*    (2006.01)
(Continued)

(52) U.S. Cl.
CPC ............. *G01D 13/20* (2013.01); *B60K 37/02* (2013.01); *B60Q 3/14* (2017.02); *B60Q 3/62* (2017.02);
(Continued)

(58) Field of Classification Search
CPC . B60Q 3/002; B60Q 3/14; B60Q 3/62; B60K 2350/203; B60K 2350/206;
(Continued)

(56) References Cited

U.S. PATENT DOCUMENTS 7,494,256 B1    2/2009 Kelman et al.
7,571,696 B1    8/2009 Fong et al.
(Continued)

FOREIGN PATENT DOCUMENTS

DE    10 2007 063057 A1    7/2008
EP    0 997 338 A2    5/2000
(Continued)

OTHER PUBLICATIONS

International Search Report, dated Jun. 18, 2015, from corresponding PCT Application.

*Primary Examiner* — Laura Gudorf
(74) *Attorney, Agent, or Firm* — Young & Thompson

(57) ABSTRACT

A display device for a motor vehicle having at least one annular gauge (1) and a display panel (2) having a display surface (20) intended to be oriented toward the inside of a passenger compartment of the vehicle. The device comprises a transparent pane (4) positioned facing the display surface (20) and serving as a support for the annular gauge (1).

14 Claims, 4 Drawing Sheets

(51) Int. Cl.
  *B60K 37/02* (2006.01)
  *G01D 11/28* (2006.01)
  *B60Q 3/62* (2017.01)
  *B60Q 3/14* (2017.01)

(52) U.S. Cl.
  CPC ...... *G01D 11/28* (2013.01); *B60K 2350/1064* (2013.01); *B60K 2350/203* (2013.01); *B60K 2350/206* (2013.01); *B60K 2350/2086* (2013.01); *B60K 2350/402* (2013.01); *B60K 2350/408* (2013.01)

(58) Field of Classification Search
  CPC ...... B60K 2350/402; B60K 2350/2086; G01D 11/28; G01D 13/20
  See application file for complete search history.

(56) References Cited

U.S. PATENT DOCUMENTS

| | | | |
|---|---|---|---|
| 2004/0207771 A1* | 10/2004 | Kameda | B60K 37/02 349/16 |
| 2006/0029525 A1 | 2/2006 | Laugharn, Jr. et al. | |
| 2007/0040697 A1 | 2/2007 | Suess et al. | |
| 2007/0090970 A1 | 4/2007 | Watabe | |
| 2008/0157950 A1 | 7/2008 | Mori et al. | |
| 2009/0056617 A1 | 3/2009 | Forster | |
| 2009/0085734 A1 | 4/2009 | Gila et al. | |
| 2009/0135580 A1 | 5/2009 | Suess et al. | |
| 2010/0058976 A1 | 3/2010 | Mayer et al. | |
| 2010/0134262 A1 | 6/2010 | Lefaure | |
| 2012/0264102 A1 | 10/2012 | Ludewig et al. | |
| 2014/0000508 A1* | 1/2014 | Liburdi | G01D 13/04 116/284 |
| 2014/0073260 A1 | 3/2014 | Bettecken et al. | |

FOREIGN PATENT DOCUMENTS

| | | |
|---|---|---|
| EP | 2 246 670 A1 | 11/2010 |
| FR | 2 892 550 A1 | 4/2007 |
| FR | 2 915 927 A1 | 11/2008 |
| FR | 2 951 588 A1 | 4/2011 |
| WO | 2005/005931 A2 | 1/2005 |
| WO | 2007/036474 A1 | 4/2007 |
| WO | 2007/042322 A1 | 4/2007 |
| WO | 2007/059928 A1 | 5/2007 |
| WO | 2008/095651 A2 | 8/2008 |
| WO | 2011/047996 A1 | 4/2011 |

* cited by examiner

DISPLAY DEVICE FOR A MOTOR VEHICLE

The present invention relates to a display device for a motor vehicle of the kind having at least one annular gauge and a display panel with a display surface.

Motor vehicles have display devices for providing information to the driver, such as the speed of the vehicle, the engine rotation speed, the engine temperature and indicators of the use of components or warning indicators in cases of diagnosed malfunction.

For example, there is a display device with an annular gauge, in which a fixed scale takes the form of a portion of a circle and a pointer pivots about an axis in the center of the portion of the circle. A portion of the pointer crosses the scale, thereby indicating a value. Documents WO 2005/005931A2, WO 2007/036474A1 and WO 2007/059928A1 show examples of these devices. In these devices, which are annular gauges, the pointer is supported by a toothed crown placed under the scale. The ring gear is guided by rollers and is driven by a stepper motor via a pinion which engages with the crown. Thus the central part, inside the crown, can be occupied by other display elements.

The device of document WO 2007/042322A1 is a gauge having a first pointer mounted pivotably behind a dial, and, in some versions, a second coaxial pointer passing through the dial to pivot independently. Similarly, documents WO 2008/095651A2 and WO 2011/047996A1 show a pointer mounted pivotably behind a dial and curved so as to have a reading part in front of the dial.

Present-day technologies make it possible to use large display panels to display all the desired information. Such technologies are known, for example, by the abbreviations TFT or LCD, or by terms such as plasma. However, these panels are usually rectangular in shape. Production of panels in special shapes would be prohibitively expensive. The constraints concerning the fastening of pointer display units reduce the possible size of these panels in display devices combining the two display means.

The invention is intended to provide a combined display device for a motor vehicle, comprising an annular gauge and incorporating a display panel of the largest possible size.

With these aims in view, the invention proposes a display device for a motor vehicle, the device having at least one annular gauge and a display panel having a display surface intended to face the inside of a passenger compartment of the vehicle, and being remarkable in that the device comprises a transparent pane positioned facing the display surface and serving to support the annular gauge, the pane having marks at the periphery of the annular gauge.

The transparent pane makes a support available for the annular gauge, for the purpose of fastening the gauge in front of the display panel. Since the pane is transparent, all the surface elements of the panel that are not masked by the annular gauge can be used to display information. The dimensions of the panel are not constrained by the presence of the gauge, and a panel of rectangular shape can be used. This does not have to be designed in a special way relative to the display device. Additionally, the marks at the periphery of the gauge can be used, for example, as graduations for this gauge. They are in a plane very close to the gauge, thereby increasing the reliability of the gauge by limiting the risks due to parallax. Particular effects may also be provided for forming the marks, for example by using more or less pronounced etching.

According to an improvement, the gauge has a cut-out center to leave the surface of the panel visible. Thus information can be displayed in the center of the gauge.

According to another characteristic, the dimensions of the panel are greater than those of the gauge. Information can therefore be displayed at the periphery of the annular gauge.

According to a structural arrangement, the gauge has a support ring fastened to the pane.

In particular, the support ring comprises a crown extending over the pane so as to cover it at the periphery of an opening, and a tubular part connected to the crown and passing through the opening. The ring provides a lining for the opening cut in the pane, by masking the periphery of the opening. The tubular part can also serve as a guide for the other components of the gauge.

According to other arrangements:

the gauge comprises an annulus mounted rotatably and guided on the tubular part, the annulus carrying a pointer which projects beyond the crown. Since the pointer is carried by the annulus, the central part of the gauge remains free, and the panel surface is visible through this area. Depending on the orientation of the tubular part of the ring, the annulus and the pointer are placed either between the pane and the panel, or outside the pane. The advantage of the first option is that the pointer is placed in a plane closer to the panel and reinforces the perception of integration between the panel and the gauge;

the device comprises at least one light source at the periphery of the pane, to illuminate the marks by using the pane as a light guide;

the light source comprises an optical guide extending obliquely or perpendicularly to the pane and having a reflection surface facing an edge of the pane, to reflect the light toward the pane. This reduces the overall dimensions of the device in the plane of the pane;

an optical fiber-based prism is positioned on the panel in the cut-out of the gauge. The optical fiber prism is composed of a large number of optical fibers placed parallel to one another. The prism has two opposed faces connected by optical fibers. Thus the image generated by the panel can be shifted so that it is perceived as originating from a plane in front of the panel.

The understanding of the invention will be enhanced and other features and advantages will be made apparent by the following description, which refers to the attached drawings, in which.

Figure 1:
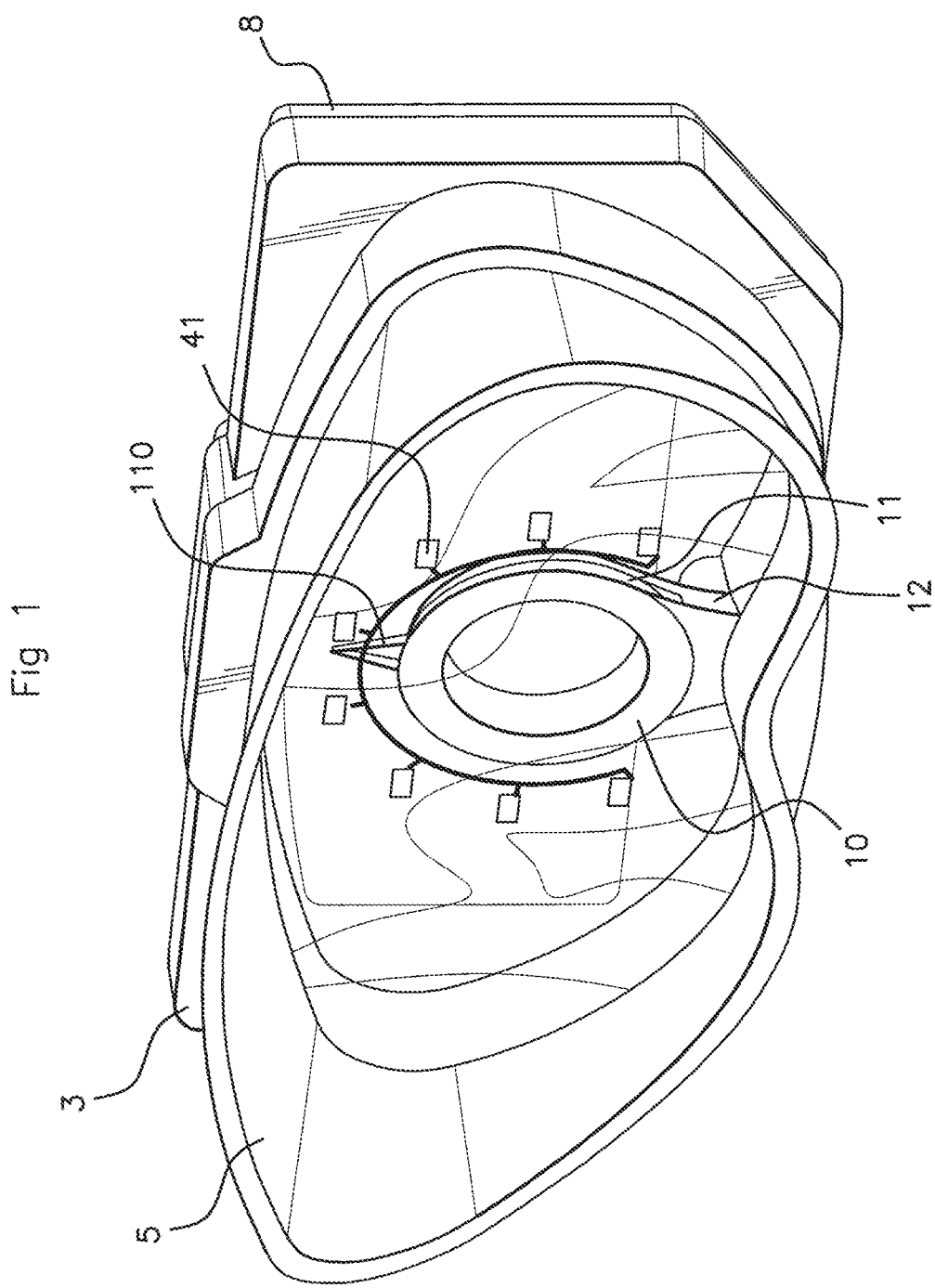
FIG. 1 is a perspective view of a display device according to a first embodiment of the invention.
Figure 2:
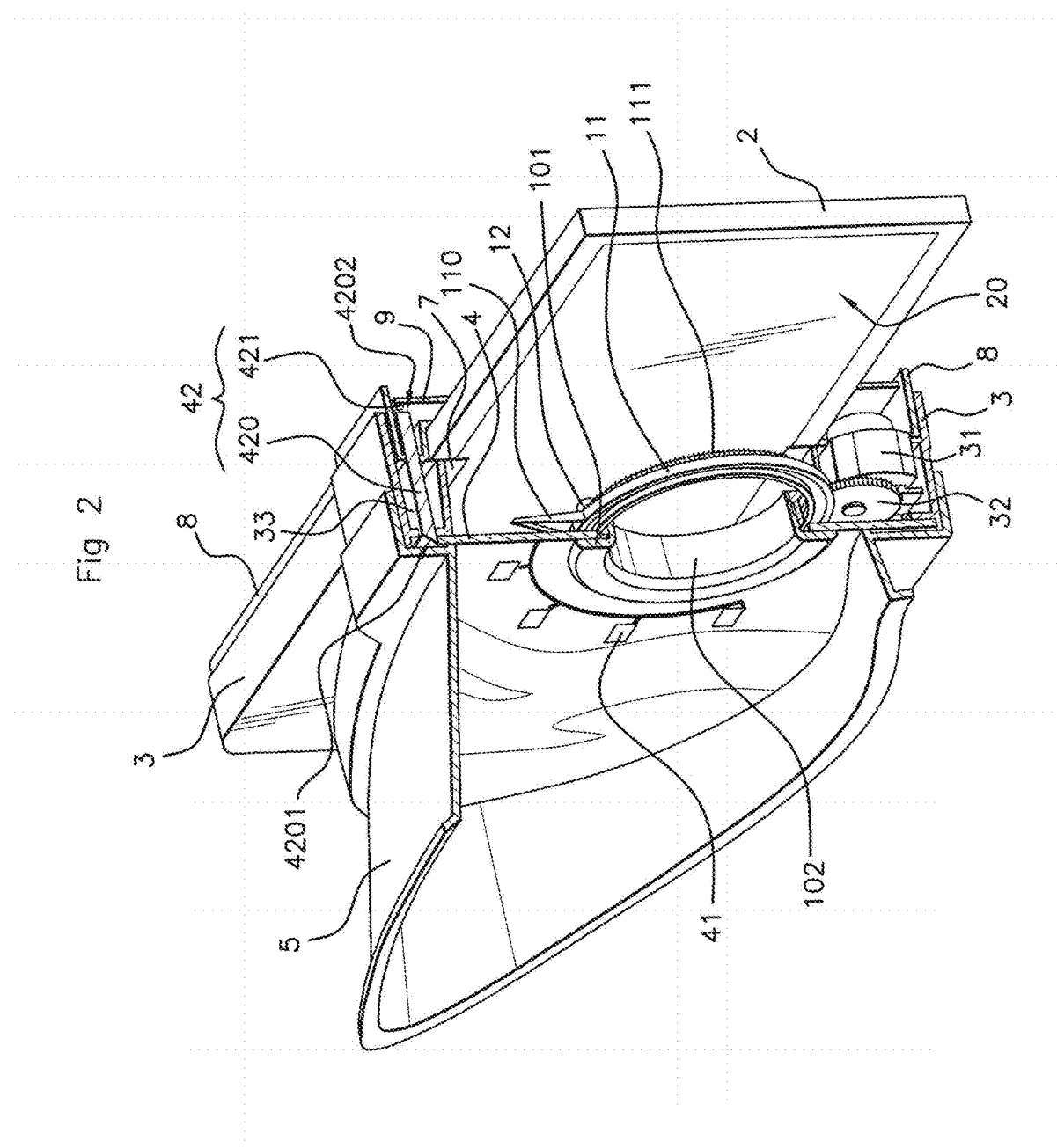
FIG. 2 is a cut-away view of the display device of FIG. 1.
Figure 3:
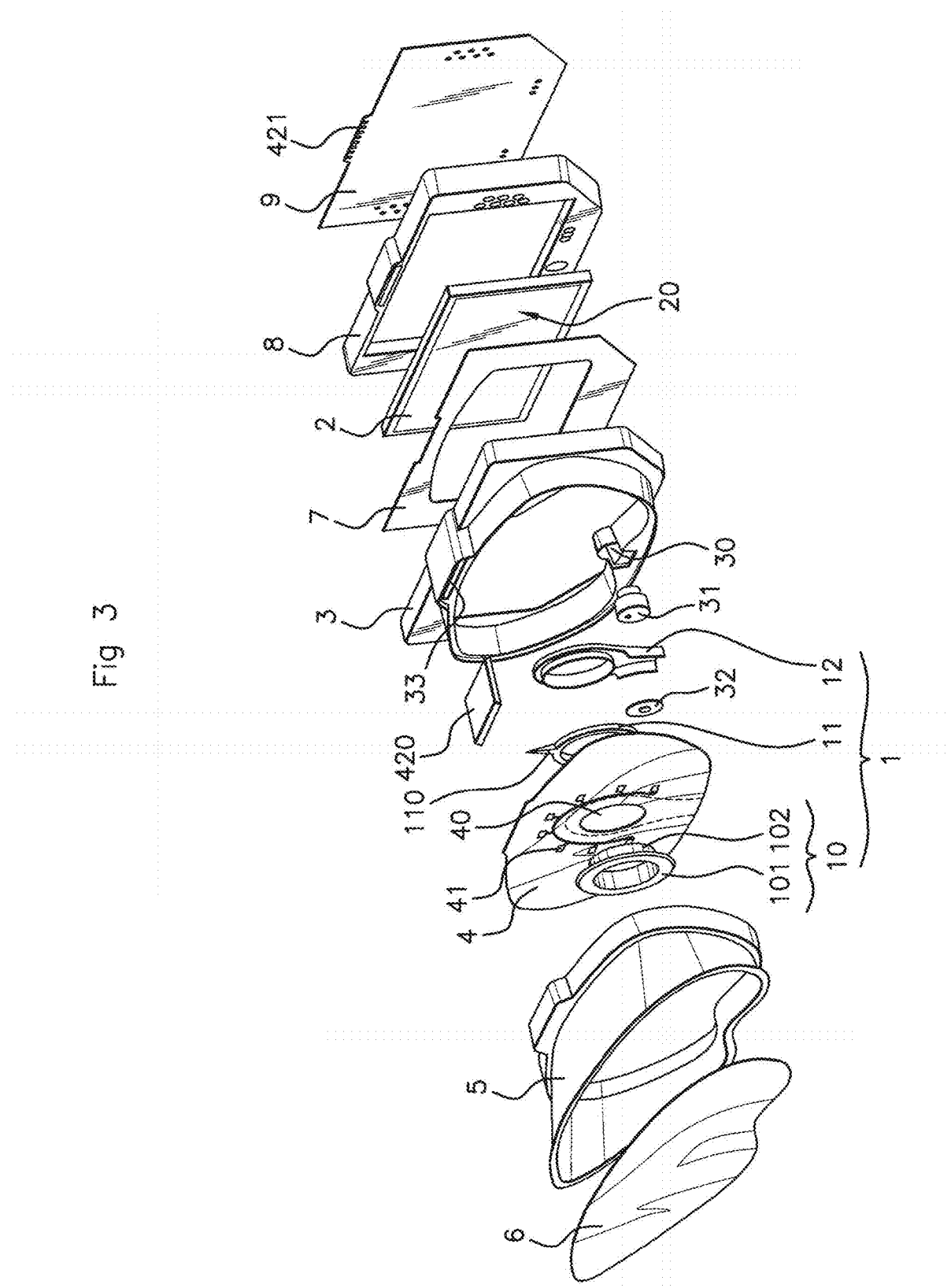
FIG. 3 is an exploded view of the display device of FIG. 1.
Figure 4:
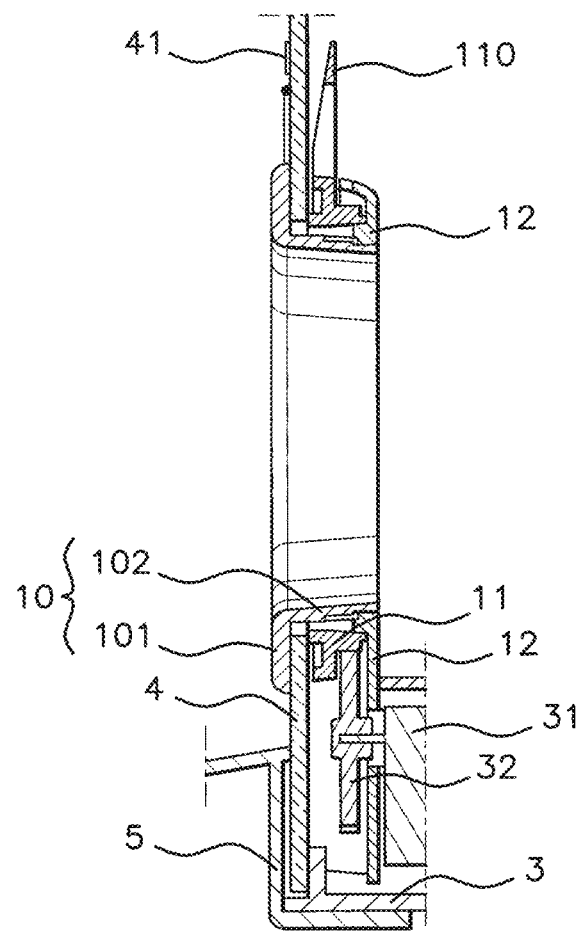
FIG. 4 is a partial section through the device of FIG. 1.

In the following description, the "front" and "rear" orientations are to be interpreted with respect to the direction of observation by a user of the vehicle in which a display device according to the invention is installed. The "upper" and "lower" orientations are given with respect to the ordinary mounting position of the device in the vehicle.

A display device for a motor vehicle according to a first embodiment of the invention, shown in FIGS. 1 to 4, comprises an annular gauge 1 and a display panel 2 placed behind the annular gauge 1. Thus a display surface 20 of the panel 2 is oriented toward the front, in other words toward the inside of a passenger compartment of the vehicle. The panel 2 enables a visible image to be generated on the display surface 20.

The device is composed of a structure having the following elements:
- a surround 3, of rectangular shape, having a kidney-shaped central cut-out;
- a transparent pane 4 adjusted at the periphery of the central cut-out so as to be centered on the surround 3;
- a hood 5, fitted on the surround 3 so as to press the pane 4 against the surround 3 by clamping its periphery;
- a transparent screen 6 fastened to the hood 5;
- a mask 7 received by the surround 3 opposite the pane 4;
- a frame 8 fitted into the surround 3 and pressing the mask 7 against the surround; the frame 8 carries the panel 2 and presses it against the mask 7;
- an electronic circuit card 9 carried by the frame 8 and held behind the panel 2.

Thus the transparent pane 4 is placed facing the display surface 20.

The pane 4 also serves as a support for the annular gauge 1. For this purpose, it has an opening 40 through which a support ring 10 for the gauge passes. The support ring 10 comprises a crown 101 extending on the pane 4 so as to cover it at the periphery of the opening 40, and a tubular part 102 connected to the crown 101 and passing through the opening 40. The annular gauge 1 further comprises an annulus 11 mounted rotatably and guided on the tubular part 102. The annulus 11 carries a pointer 110 which projects beyond the crown 101 so as to be visible through the pane 4. A cap 12 is fitted onto the tubular part 102 and serves as a stop for the ring 11. The surround 3 has a housing 30 in which a stepper motor 31 is fastened. The motor drives a pinion 32 which engages with toothing 111 of the annulus 11, so as to make it pivot to a desired position. The pane 4 comprises marks 41 at the periphery of the annular gauge 1, next to which marks the pointer 110 may be located in order to indicate, for example, a speed of the vehicle, or an engine speed.

The annular gauge 1 has a cut-out center to leave the surface of the panel 2 visible. Additionally, the dimensions of the panel 2 are greater than those of the annular gauge 1, so that the panel 2 also appears through the pane 4 beyond the periphery of the annular gauge 1.

The display device comprises a light source 42 at the periphery of the pane 4, to illuminate the marks 41 by using the pane 4 as a light guide. The light source 42 comprises an optical guide 420 extending perpendicularly to the pane 4 and housed in a slide 33 of the surround 3. The optical guide 420 has a reflection surface 4201 facing the edge of the pane 4, to reflect the light toward the pane 4, and a receiving surface 4202 facing a set of light-emitting diodes 421 positioned on the electronic circuit card 9.

In operation, the diodes 421 supply light to the optical guide 420, which transmits it to the pane by means of the reflection surface 4201. The light is received by the marks 41, which thus appear luminous, unlike the rest of the pane 4. The motor 31 is controlled by the electronic circuit card 9 so as to make the annulus 11 pivot and thus place the pointer 110 in a position facing one of the marks 41 to provide an indication. The panel 2 also displays other information useful to the vehicle driver, which the driver can see in the center of the annular gauge 1 or beyond the periphery of the latter.

According to an improvement, which is not shown, an optical fiber-based prism is positioned on the panel 2 in the cut-out of the annular gauge 1, and has a display surface substantially in the plane of the pane 4. It thus enables the image generated by the panel 2 to be shifted to the position of the annular gauge 1.

Figure 5:
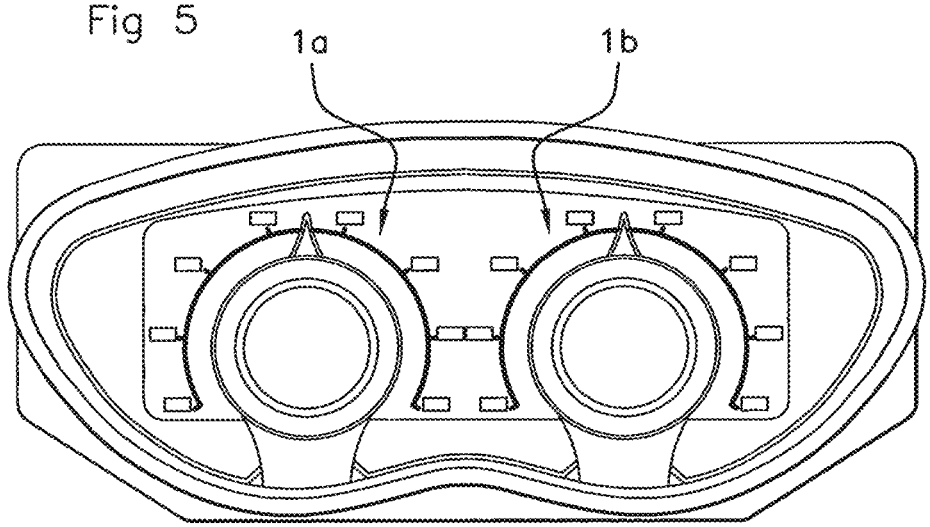
FIG. 5 is a front view of a display device according to a second embodiment of the invention.

According to a second embodiment of the invention, shown in FIG. 5, the display device has two annular gauges 1a, 1b, positioned side by side. Each gauge has its own motor (not shown), and is constructed in the same way as in the first embodiment.

The invention is not limited to the embodiments which have been described above purely by way of example. The light source could be placed directly at the periphery of the pane, or could have a larger number of optical guides.

The invention claimed is:

1. A display device for a motor vehicle, the device comprising:
   at least one annular gauge comprising a support ring,
   a display panel having a display surface configured to face an inside of a passenger compartment of the vehicle,
   a transparent pane positioned facing the display surface and serving to support the at least one annular gauge,
   wherein:
   the at least one annular gauge has a cut-out center to leave a surface of the display panel visible,
   the transparent pane having has marks at a periphery of the annular gauge,
   dimensions of the display panel are greater than those of the annular gauge, and
   the support ring of the annular gauge is fastened to the transparent pane.

2. The device as claimed in claim 1, wherein the support ring comprises a crown extending on the transparent pane so as to cover the transparent pane at the periphery of an opening, and a tubular part connected to the crown and passing through the opening.

3. The device as claimed in claim 2, wherein the annular gauge comprises an annulus mounted rotatably and guided on the tubular part, the annulus carrying a pointer projecting beyond the crown.

4. The device as claimed in claim 1, further comprising at least one light source at the periphery of the transparent pane, in order to illuminate the marks by using the transparent pane as a light guide.

5. The device as claimed in claim 4, wherein the light source comprises an optical guide extending obliquely or perpendicularly to the transparent pane and having a reflection surface facing an edge of the transparent pane to reflect the light toward the transparent pane.

6. The device as claimed in claim 1, wherein an optical fiber-based prism is positioned on the display panel in the cut-out of the annular gauge.

7. The device as claimed in claim 1, further comprising at least one light source at the periphery of the transparent pane, in order to illuminate the marks by using the transparent pane as a light guide.

8. The device as claimed in claim 2, further comprising at least one light source at the periphery of the transparent pane, in order to illuminate the marks by using the transparent pane as a light guide.

9. The device as claimed in claim 3, further comprising at least one light source at the periphery of the transparent pane, in order to illuminate the marks by using the transparent pane as a light guide.

10. The device as claimed in claim 1, wherein an optical fiber-based prism is positioned on the display panel in the cut-out of the annular gauge.

11. The device as claimed in claim 2, wherein an optical fiber-based prism is positioned on the display panel in the cut-out of the annular gauge.

12. The device as claimed in claim 3, wherein an optical fiber-based prism is positioned on the display panel in the cut-out of the annular gauge.

13. The device as claimed in claim 4, wherein an optical fiber-based prism is positioned on the display panel in the cut-out of the annular gauge.

14. The device as claimed in claim 5, wherein an optical fiber-based prism is positioned on the display panel in the cut-out of the annular gauge.

* * * * *